W. PERRIN.
Ox-Yoke.

No. 48,997. Patented July 25, 1865

Witnesses.
J. S. Whitney

Inventor.
William Perrin

UNITED STATES PATENT OFFICE.

WM. PERRIN, OF ANDOVER, MASSACHUSETTS.

IMPROVEMENT IN OX-YOKES.

Specification forming part of Letters Patent No. 48,997, dated July 25, 1865.

*To all whom it may concern:*

Be it known that I, WILLIAM PERRIN, of Andover, in the county of Essex and State of Massachusetts, have invented a new and useful Improvement in Ox-Yokes; and I do hereby declare that the following is a full and exact description thereof, reference being had to the accompanying drawings, which form a part of this specification.

Figure 2:
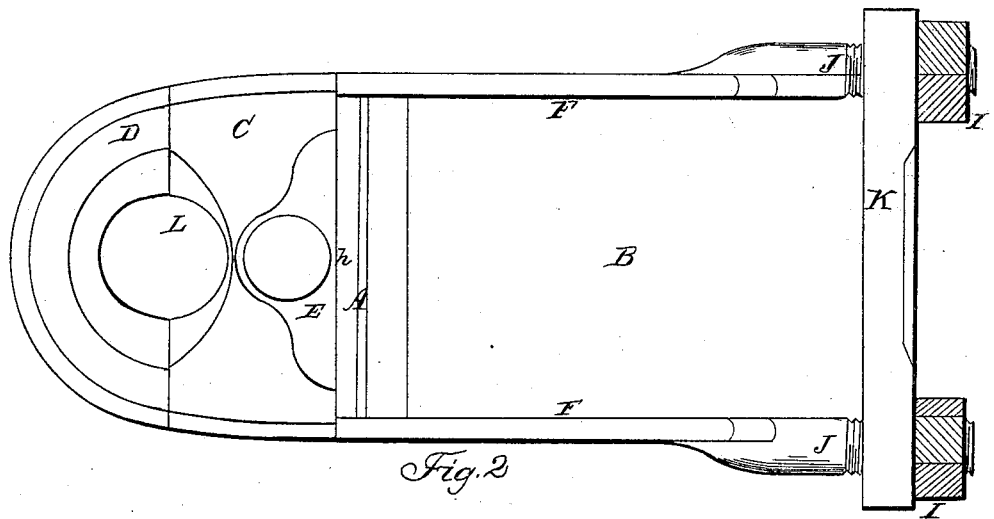
Figure 1:
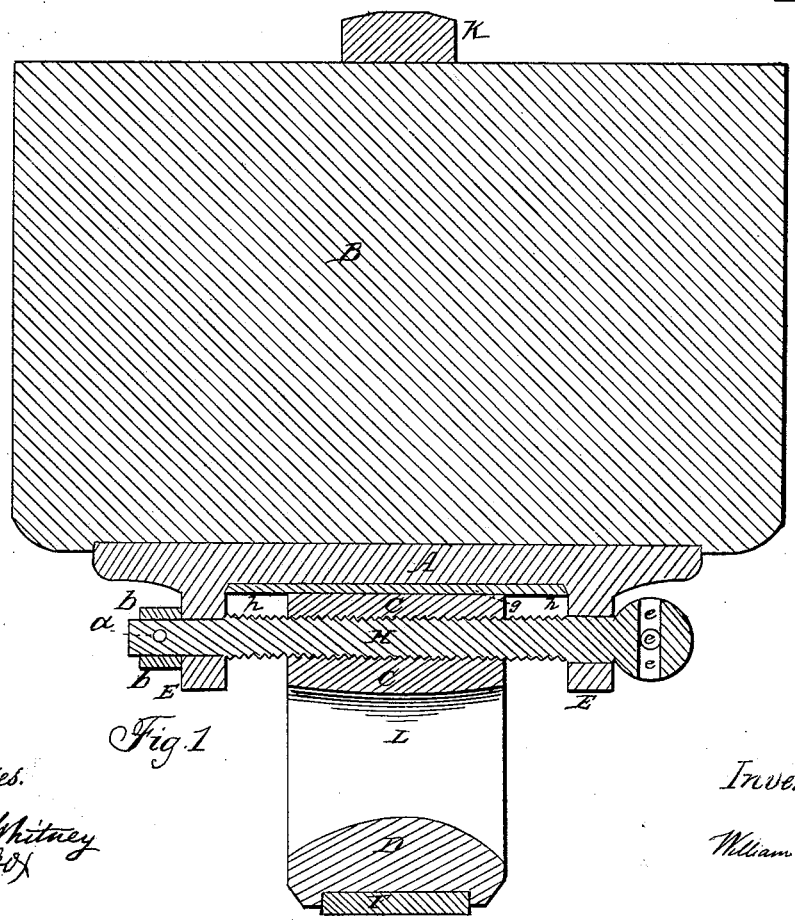

Figure 1 is a longitudinal section of my improvement as applied to an ox-yoke. Fig. 2 is an end view of the same.

Similar letters of reference indicate corresponding parts in both figures.

My improvement consists of an adjustable ring-carrier applied to the under side of the yoke at the center of its length, where the said ring-carrier is adjusted by means of a screw or screws passing into or through the same, or bearing against its ends, and arranged in suitable supports or bearings, so as to move the ring-carrier and thereby lengthen or shorten one end of the yoke.

In the drawings, A is a metallic plate fastened to the beam B of the yoke. Ears E E project downward from the plate A and serve as supports for the screw H. The ring-carrier D C is divided horizontally near the center of the hole L, which hole is made to receive the pole-ring. The strap F F fits into a groove around the bottom and sides of the ring-carrier, and extends upward on each side of the beam B, terminating in two round ends, J J, which pass through the cross-head K, and are secured by nuts I I screwed onto the said ends, thus holding the ring-carrier firmly up to the plate A on the under side of the yoke. The screw H passes through the upper part, C, of the ring-carrier, in a hole tapped to receive it. The ring-carrier D C is adjusted by turning the screw H with a pin or lever inserted in either of the holes $e\ e\ e$. The strap F F should be relieved by slackening the nuts I I previous to turning the screw H, and tightened or screwed down after the ring-carrier has been adjusted. The head of the screw H bears against the outside of one of the ears E, and the collar $f\ f$ bears against the outside of the other ear E, thus preventing lateral motion of the screw H when the ring-carrier is being adjusted. A groove, $h\ h$, extends along the under side of the plate A between the ears E E, and a projection, $g$, on the top part, C, of the ring-carrier comes in contact with the sides of the groove $h\ h$, and thereby prevents the twisting or turning of the ring-carrier to bend or injure the screw H.

My improved ring-carrier is sometimes adjusted by set-screws passing through holes in the ears E E, tapped to receive them, the ends of the set-screws bearing against the ends of the ring-carrier by unscrewing the set screw or screws on one end of the ring-carrier and screwing them up on the other end and sometimes by passing separate screws through holes in the ears E E and screwing them into holes in the ends of the ring-carrier, each screw being arranged to draw the ring-carrier toward the ear E, through which it passes.

The object of my invention is to give the weaker ox the advantage over the stronger one, which is done by moving the ring-carrier D C by means of the screw H or any other screw or screws from the weaker ox toward the stronger one, thus lengthening one end of the yoke and shortening the other end, and giving the weaker ox the long end of the yoke.

What I claim as new, and desire to secure by Letters Patent, is—

An adjustable ring-carrier applied to an ox-yoke, when the said ring-carrier is adjusted by means of a screw or screws arranged substantially as herein specified, and for the purpose set forth.

WILLIAM PERRIN.

In presence of—
   J. S. WHITNEY,
   JESSE FOX.